Figure 1:
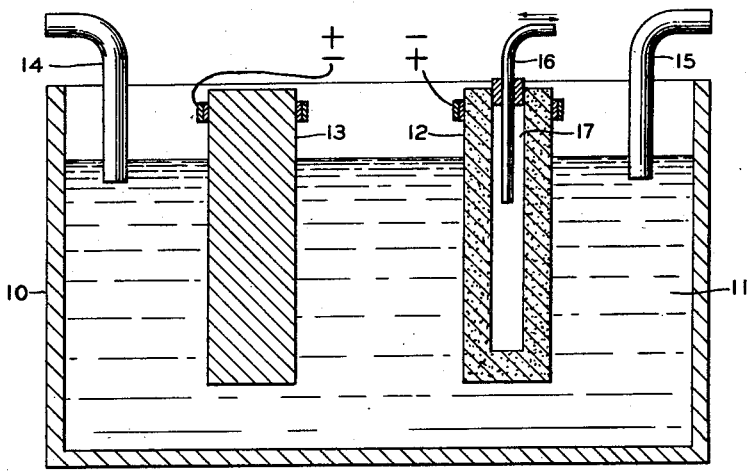

Feb. 17, 1942.                G. W. HEISE ET AL                2,273,036
                         ELECTRODEPOSITION OF METALS
                             Filed Dec. 17, 1938

INVENTORS
GEORGE W. HEISE
ERWIN A. SCHUMACHER
BY
ATTORNEY

Patented Feb. 17, 1942

2,273,036

UNITED STATES PATENT OFFICE 2,273,036

ELECTRODEPOSITION OF METALS

George W. Heise, Rocky River, and Erwin A. Schumacher, Lakewood, Ohio, assignors to National Carbon Company, Inc., a corporation of New York Application December 17, 1938, Serial No. 246,276

4 Claims. (Cl. 204—107)

The invention relates to electrolytic processes wherein an impressed electric current is passed through a cell having electrodes immersed in an aqueous electrolyte. This application is in part a continuation of our application Serial No. 118,472, filed December 31, 1936.

In its broad aspect, the invention comprises the use of porous electrodes to achieve one or more of the following objects:

(a) To decrease the voltage drop through, and the power consumption of, the cell;

(b) To provide for the introduction of one or more chemical reactants into the cell;

(c) To provide a situs for desired chemical reactions;

(d) To provide for the removal of one or more products from the cell, in some instances in relatively concentrated form, and (e) To increase the useful life of the electrodes.

The heart of the invention lies in the provision of an electrode having an effective surface area in contact with the electrolyte many times greater than the apparent or superficial area of contact, the body of the electrode being permeable either to gases alone or to both gases and liquids. Such an electrode consists, for example, of a porous or foraminous body of conductive material, preferably carbon, the dimensions of the pores and inner passages being extremely minute, as further described below.

We are aware that it has been heretofore proposed to use carbon electrodes possessing some permeability to fluids, in various electrolytic processes in an attempt to achieve one or more of the above objects; but none of these proposals has been capable of satisfactory practical application. We have found that many of the difficulties experienced by prior workers may be overcome by the use of an improved electrode material. Specifically, we have found that the electrode material should have a porosity above 35% (preferably between 40% and 70%), calculated as follows: % porosity=100 (real density—apparent density) ÷ real density. Further, the electrode material should have an air permeability above 15, and preferably above 30. Whenever used herein and in the appended claims, the term "air permeability" means the number of cubic inches of air per minute passing through one square inch cross-section of electrode material, when air at a pressure of one pound per square inch is blown through a block of the material one inch thick. The following table shows, for purposes of comparison, the porosity and permeability of ordinary electrode carbons (types 1, 2, and 3) and of the special electrode carbons included in this invention (types 4, 5, 6, and 7).

| Type | Porosity | Air permeability |
| --- | --- | --- |
|   | Per cent |   |
| 1 | 25 | 2 |
| 2 | 28 | 7 |
| 3 | 33 | 2 |
| 4 | 60 | 20 |
| 5 | 57 | 30 |
| 6 | 40 | 120 |
| 7 | 42 | 600 |

We have also found that the pores of the electrode material should be relatively minute and uniformly distributed, and not large, scattered voids and fissures. Material having the latter kind of pores might be described as "leaky" rather than "porous." The relative uniformity of distribution of the pores in the two kinds of materials may be distinguished by a simple test: if air is forced through a thin block of the material under water, at about the minimum air pressure required to obtain bubbles in the water, the "porous" material gives forth a cloud of small bubbles over its entire surface, while the "leaky" material gives a number of separate streams of bubbles issuing from the larger fissures and voids.

Another test for uniformity of porosity of these materials comprises determining the flow of a viscous liquid, such as a concentrated aqueous solution of cane sugar, under a moderate pressure, for instance a head of about six inches, through a thin (e. g. one-eighth inch) section of the material. Any relatively large fissures permit flow of the solution and are thereby made evident.

Porous electrode material within this invention may be made from comminuted solid carbonaceous material (for example, coke, graphite, or charcoal) and a porous carbonaceous binder (for instance, baked tar or pitch). Suitable methods for making such electrode material are described in U. S. Patent 1,988,478, issued on January 22, 1935, to B. E. Broadwell and L. C. Werking.

In some processes the kind of solid carbon chosen for the electrode material will make little or no difference; in other processes it will be desirable or necessary to take advantage of the fact that graphite has a higher oxygen overvoltage than coke, and that coke has a higher oxygen over-voltage than charcoal. Otherwise stated, in a given instance either a high or a low overvoltage may be influential, and the overvoltage characteristics may be accordingly controlled by a proper choice of electrode material.

Figure 2:
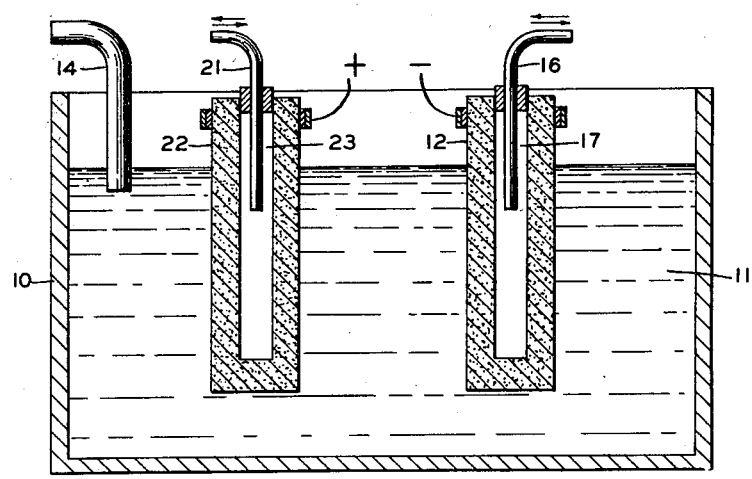

The practical application of the above-described new electrode material to electrolytic processes, according to this invention, will be described in connection with the attached drawing, in which Fig. 1 represents diagrammatically in vertical cross-section an electrolytic cell container 10 containing an electrolyte 11 in which are immersed a porous electrode 12 and a nonporous electrode 13, and Fig. 2 represents diagrammatically in vertical cross-section an electrolytic cell similar to that shown in Fig. 1 except that it contains two porous electrodes 12 and 22.

The device illustrated in Figure 1 may be used in cases where it is desired to introduce one or more reactants into the cell, or to remove one or more reaction products from the cell, through only one electrode.

The invention will be more particularly described herein in connection with certain methods for treating aqueous solutions of salts of multivalent metals, such as copper and iron. Such salts in a lower valence state may be oxidized at a porous carbonaceous anode, and anolyte containing the oxidized material withdrawn through the anode. Or the oxidized salt may be reduced at the cathode, either to metal which is deposited or to a salt in a lower valence state which may be removed with the catholyte, or alternatively a cathodic depolarizer, such as oxygen or air, may be passed through a porous carbon cathode to reoxidize the normal cathode product or to reduce the power requirement of the cell.

For example, the following processes are within the invention.

Various attempts have been made in the past to recover copper from reduced ores by leaching with cupric chloride and subsequently electrolyzing the leach liquor. In the so-called Hoepfner process, ore leaching proceeds as follows:

$$Cu_2S + 2CuCl_2 = 4CuCl + S$$

Sodium chloride is added to the solution to keep the cuprous chloride in solution. Upon electrolysis, part of the copper is deposited at the cathode and part is oxidized at the anode to regenerate the leach liquor:

$$4CuCl \rightarrow 2Cu + 2CuCl_2$$

Deposition of the copper from a cuprous salt requires one-half the energy required to deposit it from a cupric salt. Moreover, the cuprous chloride acts as an anodic depolarizer, thereby reducing the required cell voltage. However, heretofore, difficulties with diaphragms and low current efficiencies have hindered the commercial development of the process.

We have discovered by experiment that the porous carbon electrode of this invention may be utilized to overcome the above-described difficulties. Referring to Figure 1, the copper-rich leach liquor 11, containing cuprous chloride and sodium chloride, may be introduced into a cell 10 through a conduit 14; copper may be deposited at a solid cathode 13; and anolyte containing the cupric chloride formed during the depolarization reaction may be withdrawn through a porous carbon anode 12 and a suitable conduit 16. A voltage drop through the cell as low as 0.6 volt, and a current efficiency better than 90%, may be obtained.

Iron ores of several varieties including pyrrhotite, pyrites, and chalcopyrite, or metallic iron, for instance steel in process of fabrication or as scrap, may be leached with aqueous solutions of ferric chloride containing, for instance, in the neighborhood of 10 per cent ferric iron. The leaching operation produces ferrous chloride by reactions similar to:

$$2FeCl_3 + Fe \rightarrow 3FeCl_2$$

$$2FeCl_3 + FeS_2 \rightarrow 3FeCl_2 + 2S$$

Upon electrolysis of the leach liquor containing ferrous chloride, ferric chloride may be regenerated. If the ferric salt accumulates, however, it soon diffuses and lowers cell efficiency. Diaphragms can be used to decrease the rate of diffusion, but such diaphragms are difficult to maintain.

In accordance with this invention, the acidity of the electrolyte is maintained high enough to prevent the formation of insoluble compounds of iron at electrolyte temperatures of about 70° C. to 100° C. Preferably the pH of the solution should not rise substantially above 1 as measured at room temperature. Anolyte containing the ferric chloride is withdrawn through a porous carbonaceous anode, preferably at a rate of flow about 20 per cent or 30 per cent greater than the theoretical; but considerably lower rates may be used.

Not only chlorides, but also other salts may be treated in an analogous manner. For instance, solutions containing ferrous sulfate, with or without ferric sulfate, may be electrolyzed to oxidize the ferrous to ferric sulfate and the product may be removed with anolyte through a porous carbonaceous anode; appropriate modifications being made in concentration of materials in, and the pH of, the electrolyte.

It has been observed that the addition of a small proportion, say 1 per cent to 4 per cent, of sodium chloride improves the current efficiencies of the processes employing iron sulfate solutions.

Although several specific processes have herein been described in detail, it will readily be understood that these descriptions are presented only by way of examples illustrating certain aspects of the invention, and that the invention is not limited to or by such examples. Furthermore, although one shape of electrode is shown in the attached drawing as an example, the invention is not limited to that or any other specific shape. For instance, under some circumstances it may be desired to provide non-porous portions in the electrode, or to adopt a special shape, in order to regulate the distribution of fluid flowing through the electrode, or for another reason. It may also be advantageous to place a porous electrode or electrodes, not provided with a central well 17 or 23, at the end or ends of the cell container 10 in such a manner that a space is left between the electrode and the container, which space may be used to serve the functions of the central well 17 or 23 described herein.

We claim:

1. Process of depositing iron from an aqueous electrolyte containing ferrous chloride which comprises passing the electrolyte into a cell containing a cathode and a porous anode, the anode having a porosity between 40% and 70% and an air permeability above 30 and comprising comminuted solid carbonaceous material embedded in a porous carbonaceous binder having uniformly distributed pores; maintaining the pH of said electrolyte at a value not substantially above 1; passing an electric current through the electrolyte between the cathode and anode, whereby iron is deposited at the cathode and ferric chloride is formed in the anolyte; and withdrawing anolyte containing the ferric chloride through the porous anode.

2. In a continuous process for recovering copper from raw material containing copper in a valence state less than two which comprises leaching said material with an aqueous solution of cupric chloride and sodium chloride to produce a liquor containing cuprous chloride; electrolyzing the liquor, and withdrawing the electrolyzed liquor and returning it as leaching solution to the first-mentioned step of the process, the improvement which comprises effecting said electrolysis in an electrolytic cell provided with a cathode and a porous carbon anode having a porosity between 40% and 70% and an air permeability above 30 and comprising comminuted solid carbon embedded in a uniformly porous carbon binder; passing an electric current through the liquor between the anode and cathode, thereby depositing copper at the cathode and forming cupric chloride at the anode; and withdrawing through the porous anode anolyte containing the cupric chloride.

3. In a continuous process for recovering iron from raw material of the group pyrrhotite, iron pyrites, chalcopyrite, and scrap iron, which comprises leaching such material with an aqueous solution of ferric chloride to produce a liquor containing ferrous chloride; electrolyzing the liquor, and withdrawing the electrolyzed liquor and returning it as leaching solution to the first-mentioned step of the process, the improvement which comprises effecting said electrolysis in an electrolytic cell provided with a cathode and a porous carbon anode having a porosity between 40% and 70% and an air permeability above 30 and comprising comminuted solid carbon embedded in a uniformly porous carbon binder; passing an electric current through the liquor between the anode and cathode, while maintaining the pH of said liquor at a value not substantially above 1 and maintaining the temperature of the liquor between about 70° C. and about 100° C., thereby depositing iron at the cathode and forming ferric chloride at the anode; and withdrawing through the porous anode anolyte containing the ferric chloride.

4. Process of depositing metal from an aqueous electrolyte containing a salt selected from the group consisting of ferrous salts and cuprous salts which comprises passing the electrolyte into a cell containing a cathode and a porous anode, the anode having a porosity between 40% and 70% and an air permeability above 30 and comprising comminuted solid carbonaceous material embedded in a porous carbonaceous binder having uniformly distributed pores; passing an electric current through the electrolyte between the cathode and anode, whereby metal is deposited at the cathode and metal ions are oxidized at the anode; and withdrawing anolyte, containing the oxidized ions, through the porous anode.

ERWIN A. SCHUMACHER.
GEORGE W. HEISE.

Certificate of Correction

Patent No. 2,273,036.  February 17, 1942.

GEORGE W. HEISE ET AL.

It is hereby certified that error appears in the printed specification of the above numbered patent requiring correction as follows: Page 1, first column, line 45, for "+real" read ÷real; and that the said Letters Patent should be read with this correction therein that the same may conform to the record of the case in the Patent Office.

Signed and sealed this 14th day of April, A. D. 1942.

[SEAL]

HENRY VAN ARSDALE,
*Acting Commissioner of Patents.*